United States Patent

Shirakawa

(10) Patent No.: US 6,635,352 B2
(45) Date of Patent: Oct. 21, 2003

(54) COATING COMPOSITION, PROCESS FOR PRODUCING OPTICAL ELEMENT USING THE SAME, AND OPTICAL ELEMENT PRODUCED THEREBY

(75) Inventor: Hiroshi Shirakawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/127,706

(22) Filed: Apr. 23, 2002

(65) Prior Publication Data

US 2003/0008962 A1 Jan. 9, 2003

(30) Foreign Application Priority Data

Apr. 24, 2001 (JP) ........................................ 2001-125825

(51) Int. Cl.[7] .............................. B32B 9/00; C09D 4/00
(52) U.S. Cl. ...................... 428/447; 428/330; 428/403; 428/432; 428/469; 428/689; 428/701; 428/702; 428/407; 428/472; 525/100; 525/105; 526/285; 526/333; 106/285; 106/287.1; 106/287.16; 106/287.17; 106/287.19; 106/287.26
(58) Field of Search ................................. 525/100, 105; 526/285, 333; 428/689, 701, 702, 403, 407, 432, 472, 330, 447, 469; 106/285, 287.1, 287.16, 287.17, 287.19, 287.26

(56) References Cited

U.S. PATENT DOCUMENTS 5,472,797 A  * 12/1995 Yajima et al. ............... 428/688
5,744,243 A    4/1998 Li et al.

FOREIGN PATENT DOCUMENTS

| EP | 0 525 215 A1 | 2/1993 |
|---|---|---|
| EP | 0 655 495 A1 | 5/1995 |
| JP | 59-53570 | 3/1984 |
| JP | 60-161473 | 8/1985 |
| JP | 63-10640 | 1/1988 |
| JP | 63-99217 | 4/1988 |
| JP | 03-063188 | 3/1991 |
| JP | 03-163038 | 7/1991 |
| JP | 03-217230 | 9/1991 |
| JP | 06-025603 | 2/1994 |
| JP | 07-188087 | 7/1995 |
| JP | 08-043601 | 2/1996 |
| JP | 08-043602 | 2/1996 |
| JP | 08/043603 | 2/1996 |
| JP | 08-043604 | 2/1996 |
| JP | 08-113760 | 5/1996 |
| JP | 09-021901 | 1/1997 |
| JP | 10-265690 | 10/1998 |
| JP | 10-306258 | 11/1998 |
| JP | 2000-503050 | 3/2000 |

* cited by examiner

*Primary Examiner*—Deborah Jones
*Assistant Examiner*—Ling Xu
(74) *Attorney, Agent, or Firm*—Morrison & Foerster LLP

(57) ABSTRACT

A coating composition includes an organosilicon compound and an adhesion improver made of at least one compound selected from acetylene compounds of the general formulas (I-a) to (I-d):

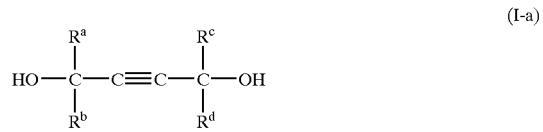

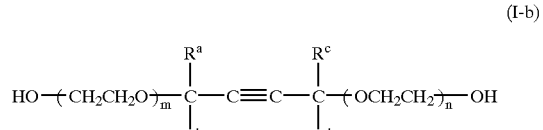

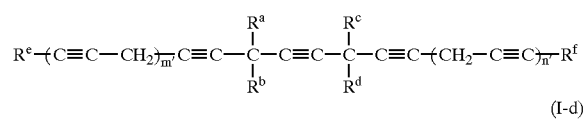

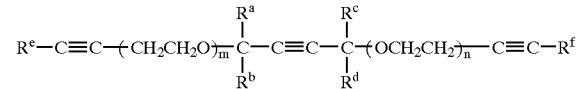

wherein $R^a$ and $R^c$ each independently represents a hydrogen atom or an optionally branched alkyl group having from 1 to 5 carbon atoms; $R^b$ and $R^d$ each independently represents an optionally branched alkyl group having from 2 to 8 carbon atoms; $R^e$ and $R^f$ each independently represents an optionally branched alkyl group having from 1 to 3 carbon atoms; m and n each indicate an integer of 1 or more; and m' and n' each indicate an integer of 0 or more.

10 Claims, No Drawings

COATING COMPOSITION, PROCESS FOR PRODUCING OPTICAL ELEMENT USING THE SAME, AND OPTICAL ELEMENT PRODUCED THEREBY

BACKGROUND OF THE INVENTION

1. Field of the Invention

This invention relates to a coating composition, a process for producing optical elements having excellent durability as well as good film hardness, scratch resistance and adhesion using the coating composition; and to optical elements produced by the process.

2. Description of the Related Art

Various methods have been proposed for improving the scratch resistance of plastic lenses which include coating plastic lenses with a coating composition made of an organosilicon compound as the major raw material, followed by curing the lenses to form a cured film thereon. The scratch resistance of plastic lenses is generally improved by employing a technique of increasing the content of inorganic oxide fine particles in the coating composition.

For example, Japanese Laid-Open Patent Application No. 10640/1988 discloses an optical element comprising a cured film made of a coating composition applied to a plastic lens substrate, the coating composition for which contains high-concentration colloidal silica, a type of fine inorganic particles, and a trifunctional organic compound. The high-concentration colloidal silica accounts for from 70 to 95 mole % (in terms of its solids content) based on the total amount of the composition.

However, the optical element disclosed in the above-cited patent, which has a cured film containing high-concentration inorganic fine particles, is problematic in that the stresses generated by the substrate and the high-concentration inorganic fine particles-containing cured film are liable to lower the adhesion between the cured film and the antireflection film formed thereon.

Methods of adding high-concentration inorganic fine particles to the coating film or increasing the degree of crosslinking in the film are generally employed for hardening the coating film. Anyhow, when the coating film is hardened, the hard film does not absorb the stress change resulting from the antireflection film formed thereon, and the interface between the hard film and the antireflection film is distorted, thereby lowering significantly the adhesion between the two films.

SUMMARY OF THE INVENTION

This invention provides a coating composition capable of forming a cured film having excellent scratch resistance and excellent adhesion between the cured film and an antireflection film formed thereon, an optical element having excellent scratch resistance, whose adhesion between the cured film and the antireflection film is little impaired, and a process for producing such optical elements.

In accordance with the invention, a coating composition for a cured film to be formed between a plastic substrate and an antireflection film made of an inorganic oxide contains an organosilicon compound and an adhesion improver made of an acetylene compound having a specific structure as described below.

Specifically, the invention provides a coating composition for forming a cured film between a plastic substrate and an antireflection film made of an inorganic oxide, which contains an organosilicon compound and an adhesion improver made of an acetylene compound of the general formulas (I-a) to (I-d):

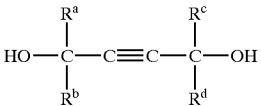

(I-a)

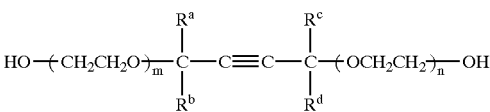

(I-b)

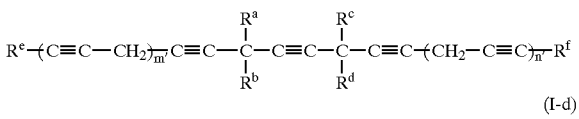

(I-c)

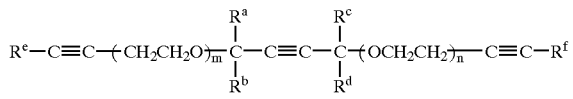

(I-d)

wherein $R^a$ and $R^c$ each independently represent a hydrogen atom or an optionally branched alkyl group having from 1 to 5 carbon atoms; $R^b$ and $R^d$ each independently represent an optionally branched alkyl group having from 2 to 8 carbon atoms; $R^e$ and $R^f$ each independently represent an optionally branched alkyl group having from 1 to 3 carbon atoms; m and n each indicate an integer of 1 or more; and m' and n' each indicate an integer of 0 or more;

The invention also includes a process for producing optical elements, which comprises forming a cured film of the coating composition described herein on a plastic substrate, and forming an antireflection film of an inorganic oxide on the cured film, as well as an optical element having a cured film made of the coating composition formed on a plastic substrate, and having an antireflection film made of an inorganic oxide formed on the cured film, which may be produced by this process.

DETAILED DESCRIPTION OF THE INVENTION

The coating composition of the invention contains an acetylene glycol compound of formula (I-a) or (I-b), or an acetylene compound of formula (I-c) or (I-d), and the adhesion between its cured film and the antireflection film that overlies it is good for a long time even when the cured film contains high-concentration inorganic fine particles. When the antireflection film contains a metal atom but not a metal oxide, the affinity between the metal atom and the triple bond in the acetylene glycol compound of formula (I-a) or (I-b), a type of acetylene compounds, or that in the acetylene compound of formula (I-c) or (I-d), is better and the metal atom itself relaxes the stress of the antireflection film. In this case, therefore, the adhesion between the cured film and the antireflection film is higher.

In formulas (I-a) and (I-b), $R^a$ and $R^c$ each represents a hydrogen atom or an optionally branched alkyl group. For these, preferred is a linear or branched alkyl group having from 1 to 5 carbon atoms, including, for example, methyl, ethyl, propyl, isopropyl, butyl, isobutyl, tert-butyl and pentyl groups. For $R^b$ and $R^d$ each representing an optionally branched alkyl group, preferred is a linear or branched alkyl group having from 2 to 8 carbon atoms, including, for example, ethyl, propyl, isopropyl, butyl, isobutyl, tert-butyl and pentyl groups. m and n independently are integers of 1 or more, and preferably from 4 to 12.

The acetylene glycol compound of formula (I-a) is, for example, 2,4,7,9-tetramethyl-5-decyne-4,7-diol. The acetylene glycol compound of formula (II) is, for example, an adduct of 2,4,7,9-tetramethyl-5-decyne-4,7-diol having from 3 to 10 moles of polyoxyethylene added thereto.

The acetylene compounds of formulas (I-a) and (I-b) are known and are disclosed in, for example, Japanese Laid-Open Patent Application Nos. 53570/1984, 161473/1985, 99217/1988, 63288/1991, 163038/1991, 188087/1995, 265690/1998 and 20104/1999; International Patent Publication No. 503050/2000; Japanese Laid-Open Patent Application Nos. 43601/1996, 43602/1996, 43603/1996 and 43604/1996. However, the applications of the compounds disclosed in these documents are as surfactants for improving the defoaming property of the compositions containing the compound and for improving the dispersibility and the wettability of a dye in the compositions, without any suggestions of the use of these acetylene glycol compounds for improving the long-lasting adhesion to an antireflection film of a cured film even though it contains high-concentration inorganic fine particles, as in this invention.

The content of the acetylene glycol compound of formula (I-a) or (I-b) in the coating composition preferably ranges from 1 to 5% by weight based on the total weight of the composition.

The acetylene compounds of formulas (I-c) or (I-d) are novel compounds that are obtained starting from the acetylene glycol compounds of formulas (I-a) or (I-b). For producing them, the hydroxyl group that is present at the α-position relative to the triple bond in formula (I-a), or the terminal hydroxyl group of the polyethylene glycol that is presented at the α-position relative to the triple bond in formula (I-b), is reacted. The solvent to be used for the reaction is methylene chloride. Using 2.2 equivalents of tosyl chloride, 3 equivalents of triethylamine and 0.1 equivalents of dimethylaminopyridine, the starting compound is tosylated, and then 2.2 equivalents of an alkyne compound such as methylacetylene (propyne) is added thereto and reacted to obtain the intended compound. The reaction solvent to be used may be anhydrous THF.

In formulas (I-c) and (I-d), $R^a$ and $R^c$ each represents a hydrogen atom or an optionally branched alkyl group. For these, preferred is a linear or branched alkyl group having from 1 to 5 carbon atoms, including, for example, methyl, ethyl, propyl, isopropyl, butyl, isobutyl, tert-butyl and pentyl groups. For $R^b$ and $R^d$ each representing an optionally branched alkyl group, preferred is a linear or branched alkyl group having from 2 to 8 carbon atoms, including, for example, ethyl, propyl, isopropyl, butyl, isobutyl, tert-butyl and pentyl groups. $R^e$ and $R^f$ each represents an optionally branched alkyl group having from 1 to 3 carbon atoms m and n each are an integer of 1 or more, and preferably from 4 to 12. m' and n' each are integers of 0 or more, and preferably from 0 to 2.

The content of the acetylene compound of formula (I-c) or (I-d) in the coating composition preferably ranges from 1 to 5% by weight based on the total weight of the composition.

In the coating composition of the invention, the organosilicon compound is preferably at least one member selected from the group consisting of compounds represented by the following general formulas (II) and (III), and hydrolyzates thereof:

wherein $R^1$ and $R^3$ each independently represent a monovalent hydrocarbon group having from 1 to 10 carbon atoms and having or not having a functional group; $R^2$ represents an alkyl group having from 1 to 8 carbon atoms, an aryl group having from 6 to 10 carbon atoms, an aralkyl group having from 7 to 11 carbon atoms, or an acyl group having from 1 to 8 carbon atoms; a and b are each 0 or 1; and $OR^2$'s may be the same or different; $R^4$ and $R^5$ each independently represents a monovalent hydrocarbon group having from 1 to 5 carbon atoms and having or not having a functional group; $X^1$ and $X^2$ each independently represents an alkyl group having from 1 to 4 carbon atoms or an acyl group having from 1 to 4 carbon atoms; Y represents a divalent hydrocarbon group having from 1 to 20 carbon atoms; x and y are each 0 or 1; $X^1$'s may be the same or different; and $X^2$'s may be the same or different).

In general formula (II), the monovalent hydrocarbon group having from 1 to 10 carbon atoms for $R^1$ and $R^3$ may include an alkyl group having from 1 to 10 carbon atoms, an alkenyl group having from 2 to 10 carbon atoms, an aryl group having from 6 to 10 carbon atoms, or an aralkyl group having from 7 to 11 carbon atoms. The alkyl and alkenyl groups may be linear, branched or cyclic. Examples of the alkyl group having from 1 to 10 carbon atoms are methyl, ethyl, n-propyl, isopropyl, n-butyl, isobutyl, sec-butyl, tert-butyl, pentyl, hexyl, octyl, cyclopentyl and cyclohexyl groups. Examples of the alkenyl group having from 2 to 10 carbon atoms are vinyl, allyl, butenyl, hexenyl and octenyl groups. Examples of the aryl group having from 6 to 10 carbon atoms are phenyl, tolyl, xylyl and naphthyl groups. Examples of the aralkyl group having from 7 to 11 carbon atoms are benzyl, phenethyl and naphthylmethyl groups. These hydrocarbon groups may have a functional group introduced thereinto. The functional group includes, for example, a halogen atom, a glycidoxy group, an epoxy group, an amino group, a cyano group, a mercapto group, and a (meth)acryloxy group.

Examples of the monovalent hydrocarbon group having from 1 to 10 carbon atoms and having such a functional group are glycidoxymethyl, α-glycidoxyethyl, β-glycidoxyethyl, α-glycidoxypropyl, β-glycidoxypropyl, γ-glycidoxypropyl, (α-glycidoxybutyl, β-glycidoxybutyl, γ-glycidoxybutyl, δ-glycidoxybutyl, (3,4-epoxycyclohexyl)methyl, β-(3,4-epoxycyclohexyl)ethyl, γ-(3,4-epoxycyclohexyl)propyl, δ-(3,4-epoxycyclohexyl)butyl, chloromethyl, γ-chloropropyl, 3,3,3-trifluoropropyl, γ-methacryloxypropyl, γ-acryloxypropyl, γ-mercaptopropyl, β-cyanoethyl, N-(β-aminoethyl)γ-aminopropyl and γ-aminopropyl groups.

On the other hand, the alkyl group having from 1 to 8 carbon atoms for $R^2$ may be linear, branched or cyclic. Its examples are methyl, ethyl, n-propyl, isopropyl, n-butyl, isobutyl, sec-butyl, tert-butyl, pentyl, hexyl, cyclopentyl and cyclohexyl groups. Examples of the aryl group having from 6 to 10 carbon atoms are phenyl, tolyl and xylyl groups; and examples of the aralkyl group having from 7 to 11 carbon atoms are benzyl and phenethyl groups. Examples of the acyl group having from 1 to 8 carbon atoms are an acetyl group.

Examples of the compounds represented by the general formula (II) are methyl silicate, ethyl silicate, n-propyl silicate, isopropyl silicate, n-butyl silicate, sec-butyl silicate, tert-butyl silicate, tetraacetoxysilane, methyltrimethoxysilane, methyltripropoxysilane, methyltriacetoxysilane, methyltributoxysilane, methyltriamyloxysilane, methyltriphenoxysulane, methyltribenzyloxysilane, methyltriphenethyloxysilane, glycidoxymethyltriethoxysilane,
glycidoxymethyltrimethoxysilane,
α-glycidoxyethyltrimethoxysilane,
α-glycidoxyethyltriethoxysilane,
β-glycidoxyethyltriethoxysilane,
α-glycidoxypropyltrimethoxysilane,
α-glycidoxypropyltriethoxysilane,
β-glycidoxypropyltrimethoxysilane,
β-glycidoxypropyltriethoxysilane,
γ-glycidoxypropyltrimethoxysilane,
γ-glycidoxypropyltriethoxysilane,
γ-glycidoxypropyltripropoxysilane,
γ-glycidoxypropyltriphenoxysilane,
α-glycidoxybutyltrimethoxysilane,
α-glycidoxybutyltriethoxysilane,
β-glycidoxybutyltrimethoxysilane,
β-glycidoxybutyltriethoxysilane,
γ-glycidoxybutyltrimethoxysilane,
γ-glycidoxybutyltriethoxysilane,
δ-glycidoxybutyltrimethoxysilane,
δ-glycidoxybutyltriethoxysilane, (3,4-epoxycyclohexyl)methyltriethoxysilane, (3,4-epoxycyclohexyl)methyltrimethoxysilane, β-(3,4-epoxycyclohexyl)ethyltriethoxysilane, β-(3,4-epoxycyclohexyl)ethyltrimethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane,
glycidoxymethylmethyldimethoxysilane,
glycidoxymethylmethyldiethoxysilane,
α-glycidoxyethlmethyldimethoxysilane,
α-glycidoxyethylmethyldiethoxysilane,
β-glycidoxyethylmethyldimethoxysilane,
β-glycidoxyethylmethyldiethoxysilane,
α-glycidoxypropylmethyldimethoxysilane,
α-glycidoxypropylmethyldiethoxysilane,
β-glycidoxypropylmethyldimethoxysilane,
α-glycidoxypropylmethyldiethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldiphenoxysilane,
γ-glycidoxypropylethyldimethoxysilane,
γ-glycidoxypropylethyldiethoxysilane,
γ-glycidoxypropylvinyldimethoxysilane,
γ-glycidoxypropylvinyldiethoxysilane,
γ-glycidoxypropylphenyldimethoxysilane,
γ-glycidoxypropylphenyldiethoxysilane,
ethyltrimethoxysilane, ethyltriethoxysilane,
vinyltrimethoxysilane, vinyltriacetoxysilane,
vinyltriethoxysilane, phenyltrimethoxysilane,
phenyltriethoxysilane, phenyltriacetoxysilane,
γ-chloropropyltrimethoxysilane,
γ-chloropropyltriacetoxysilane, 3,3,3-trifluoropropyltrimethoxysilane,
γ-methacryloxypropyltrimethoxysilane,
γ-mercaptopropyltrimethoxysilane,
γ-mercaptopropyltriethoxysilane,
β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropylmethyldiethoxysilane,
dimethyldimethoxysilane, phenylmethyldimethoxysilane,
dimethyldiethoxysilane, phenylmethyldiethoxysilane,
γ-chloropropylmethyldiethoxysilane,
γ-chloropropylmethyldimethoxysilane,
dimethyldiacetoxysilane,
γ-methacryloxypropylmethyldimethoxysilane,
γ-methacryloxypropylmethyldiethoxysilane,
γ-mercaptopropylmethyldimethoxysilane,
γ-mercaptopropylmethyldiethoxysilane,
methylvinyldimethoxysilane, and methylvinyldiethoxysilane.

On the other hand, in the general formula (III), the alkyl group having from 1 to 4 carbon atoms for $X^1$ and $X^2$ includes methyl, ethyl, n-propyl, isopropyl, n-butyl, isobutyl, sec-butyl and tert-butyl groups; and the acyl group having from 1 to 4 carbon atoms is, for example, preferably an acetyl group. These $X^1$ and $X^2$ may be the same or different.

The monovalent hydrocarbon group having from 1 to 5 carbon atoms for $R^4$ and $R^5$ includes an alkyl group having from 1 to 5 carbon atoms and an alkenyl group having from 2 to 5 carbon atoms. These may be linear or branched. Examples of the alkyl group are methyl, ethyl, n-propyl, isopropyl, n-butyl, sec-butyl, tert-butyl and pentyl groups. Examples of the alkenyl group are vinyl, allyl and butenyl groups. These hydrocarbon groups may have a functional group introduced thereinto. For the functional group and the functional group-having hydrocarbon group, referred to are the same as those mentioned hereinabove for $R^1$ and $R^3$ in the general formula (II). These $R^4$ and $R^5$ may be the same or different.

For the divalent hydrocarbon group having from 1 to 20 carbon atoms for Y, preferred are an alkylene group and an alkylidene group, including, for example, methylene, ethylene, propylene, butylene, pentylene, hexylene, octylene, ethylidene and propylidene groups.

In the above compounds, x and y are 0 or 1; the $OX^1$'s may be the same or different and the $OX^2$'s may also be the same or different.

Examples of the compounds represented by the general formula (III) are methylenebis(methyldimethoxysilane), ethylenebis(ethyldimethoxysilane), propylenebis(ethyldiethoxysilane), and butylenebis(methyldiethoxysilane).

In the coating composition of the invention, the organosilicon compound may be one or more compounds selected from the compounds represented by the general formulas (II) and (III) and their hydrolyzates. The hydrolyzates may be prepared by adding an aqueous basic solution such as an aqueous sodium hydroxide or ammonia solution or an aqueous acidic solution such as an aqueous hydrochloric acid solution to the compound represented by general formula (II) or (III), followed by stirring the mixture.

If desired, a curing agent as well as various organic solvents and surfactants for the purposes of improving wettability during the application and improving the smoothness of the cured film, UV absorbents, antioxidants, light stabilizers and anti-aging agents may be added as long as the properties of the coating composition itself and the cured film are not influenced.

Preferably, the coating composition of the invention further contains inorganic oxide fine particles. These inorganic oxide fine particles are not specifically defined, and may be arbitrarily selected from known ones. Examples of the inorganic oxide fine particles are fine particles of single metal oxides such as aluminum oxide, titanium oxide, antimony oxide, tin oxide, zirconium oxide, silicon oxide, cerium oxide, and iron oxide; as well as fine particles of composite oxides such as fine particles of a tin oxide-zirconium oxide-tungsten oxide composite as disclosed in Japanese Laid-Open Patent Application No. 25603/1994; fine particles of a tin oxide-tungsten oxide composite as disclosed in Japanese Laid-Open Patent Application No.

217230/199 1; fine particles of a composite metal oxide of titanium oxide, cerium oxide and silicon oxide as disclosed in Japanese Laid-Open Patent Application No. 113760/1996; fine particles of a titanium oxide-zirconium oxide-tin oxide composite as disclosed in Japanese Laid-Open Patent Application No. 306258/1998; and fine particles of a titanium oxide-zirconium oxide-silicon oxide composite and of a stannic oxide-zirconium oxide-tungsten oxide composite as disclosed in Japanese Laid-Open Patent Application No. 21901/1997.

The mean particle size of the inorganic oxide fine particles may be generally in the range of from 1 to 500 nm. One or more the same or different types of such inorganic oxide fine particles may be used either singly or in the form of a mixture. Though varying depending on the type of the plastic substrate, the constitution of the antireflection film, the composition of the cured film and the fabricating conditions, the cured film made of the coating composition that contains the acetylene glycol compound enjoys good adhesion to the antireflection film made of an inorganic oxide even when the content of the inorganic oxide fine particles in the coating composition is high as 30% by weight based on the total weight of the composition.

The preferred content of the inorganic oxide fine particles is from about 10 to about 30% by weight based on the total weight of the coating composition, though varying depending on the plastic substrate, the constitution of the antireflection film, the composition of the cured film and the fabricating conditions.

When the amount of the inorganic oxide fine particles is from 10 to 30% by weight of the coating composition prior to curing, the preferred content of the inorganic oxide fine particles to be in the cured film made of the coating composition of the invention is from 30 to 60% by weight based on the total weight of the coating composition, though varying depending on the plastic substrate, the constitution of the antireflection film, the composition of the cured film and the fabricating conditions.

In the invention, applying the coating composition onto the surface of a plastic lens substrate, employable is carried out by any ordinary method of dipping, spin coating, or spraying. In view of need for face accuracy, especially preferred is dipping or spin coating. After it is applied to a plastic substrate, the coating composition is cured by drying it in hot air or by exposing it to actinic energy rays. Preferably, the coating composition is cured in hot air at 70 to 200° C., and more preferably at 90 to 150° C. For the actinic energy rays, preferred are far-infrared rays not damaging the film by heat.

The inorganic oxide used to form the antireflection film in the invention is not specifically defined and may be any ordinary one generally known as the raw material for antireflection films, including, fore example, $Ta_2O_5$, $Y_2O_3$, $ZrO_2$, $SiO_2$, $TiO_2$, $Al_2O_3$, and $Nb_2O_5$.

A base layer made of a metal or metal oxide film may be disposed between the antireflection film and the cured film made of the coating composition of the invention.

The plastic substrate is not specifically defined, and may include, for example, methyl methacrylate homopolymers, copolymers of methyl methacrylate with at least one other monomer, diethylene glycol bisallylcarbonate homopolymers, copolymers of diethylene glycol bisallylcarbonate with at least one other monomer, sulfur-containing copolymers, halogen-containing copolymers, polycarbonate, polystyrene, polyvinyl chloride, unsaturated polyesters, polyethylene terephthalate, polyurethane, and polythiourethane.

The invention will be described in more detail with reference to the following Examples, which, however, are not intended to restrict the scope of the invention.

EXAMPLE 1

Preparation of Coating Composition

Water (50.7 parts by weight), 44.4 parts by weight of γ-glycidoxypropyltrimethoxysilane, 112.6 parts by weight of $SiO_2$ dispersed in isopropyl alcohol ($SiO_2$ sol content, 30% by weight); solvents, 30 parts by weight of propylene glycol monomethyl ether, 11 parts by weight of isopropyl alcohol and 30 parts by weight of n-butanol; a curing catalyst, 3 parts by weight of acetylacetonate; and an acetylene glycol compound represented by the general formula (I) of the invention, 2 parts by weight of 2,4,7,9-tetramethyl-5-decyne-4,7-diol (Sarfinol® 104) were mixed to prepare a coating composition.

Formation of Cured Film and Antireflection Film on Plastic Substrate

After alkaline processing and washing, CR-39 lenses (made from ethylene glycol bisallyl carbonate) were dipped in the prepared coating composition and then pulled out at a rate of 15 cm/min. With that, these were heated at 120° C. for 2 hours to cure the film into hard coat lenses. An antireflection film having the constitution mentioned below was applied from the hard film side.

1st layer: Nb film, 2 nm
2nd layer: $SiO_2$ film, 0.4 λ
3rd layer: $Nb_2O_5$ film, 0.0414 λ
4th layer: $SiO_2$ film, 0.0936 λ
5th layer: $Nb_2O_5$ film, 0.1356 λ
6th layer: $SiO_2$ film, 0.0646 λ
7th layer: $Nb_2O_5$ film, 0.1588 λ
8th layer: $SiO_2$ film, 0.2723 λ
* λ indicates a wavelength of light, about 500 nm.

Evaluation of Physical Properties

The lenses having the cured film and the antireflection film formed thereon in the manner as above were tested for their physical properties according to the test methods mentioned below.
(1) Test for Adhesion Between Cured Film and Antireflection Film:

The plastic substrate coated with the hard coat film and the antireflection film was dipped in warm water at 50° C. for 48 hours, and cut to have 10×10 cross-cuts of 1 mm square each. The samples were subjected twice to a peel test ruled JIS-Z-1522 with an adhesive cellophane tape, sold by Nichiban Corp., and evaluated according to the criteria mentioned below.

OO: No peel found.

O: Some but a little peel found only in the lines of the cross-cuts.

Δ: Some peel found in the lines of the cross-cuts and even inside the cross-cuts.

x: Cross-cuts completely peeled.
(2) Test for Scratch Resistance:

The surface of the antireflection film was rubbed with 0000 steel wool under a load of 2 kg. After rubbed 20 times in that manner, the condition of each sample was checked. The samples tested were evaluated according to the criteria mentioned below.

Level 1: Deep scratches found under fluorescent lamp.

Level 2: Scratches of the same level as in ordinary plastics found.

Level 3: Scratches found.

Level 4: Scratches found, but a few.

Level 5: Few scratches found.

Level 6: No scratches found.

The results are given in Table 1. As shown in Table 1, the lenses obtained in this Example all exhibit good adhesion and scratch resistance.

EXAMPLE 2

A cured film and an antireflection film were formed on a plastic substrate in the same manner as in Example 1, for which, however, an adduct of 2,4,7,9-tetramethyl-5-decyne-4,7-diol with ethylene oxide was added to the 4,7-hydroxyl groups of the diol (Sarfinol® 465) in place of 2 parts by weight of the 2,4,7,9-tetramethyl-5-decyne-4,7-diol (Sarfinol® 104).

The results are given in Table 1. As shown in Table 1, the lenses obtained in this Example all exhibit good adhesion and scratch resistance.

EXAMPLE 3

A cured film and an antireflection film were formed on a plastic substrate in the same manner as in Example 1, for which, however, a compound having a structural formula (a) mentioned below that had been obtained by reacting Sarfinol® 104 with methylacetylene was used in place of 2 parts by weight of the 2,4,7,-tetramethyl-5-decyne-4,7-diol (Sarfinol® 104).

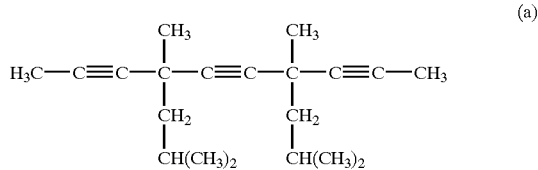

(a)

The results are given in Table 1. As shown in Table 1, the lenses obtained in this Example all exhibit good adhesion and scratch resistance.

EXAMPLE 4

A cured film and an antireflection film were formed an a plastic substrate in the same manner as in Example 1, for which, however, a compound having a structural formula (b) mentioned below that had been obtained by reacting Sarfinol® 465 with methylacetylene was used in place of 2 parts by weight of the 2,4,7,9-tetramethyl-5-decyne-4,7-diol (Sarfinol® 104).

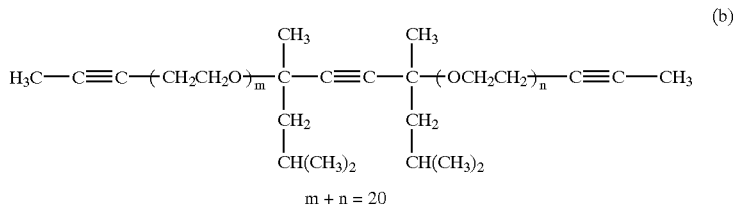

(b)

$m + n = 20$

The results are given in Table 1. As shown in Table 1, the lenses obtained in this Example all exhibit good adhesion and scratch resistance.

EXAMPLE 5

A cured film and an antireflection film were formed on a plastic substrate in the same manner as in Example 1, for which, however, a compound having a structural formula (c) mentioned below that had been obtained from Sarfinol® 104 was used in place of 2 parts by weight of the 2,4,7,9-tetramethyl-5-decyne-4,7-diol (Sarfinol® 104).

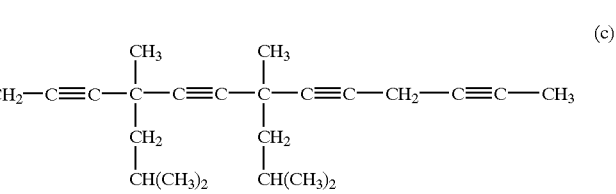

(c)

The results are given in Table 1. As shown in Table 1, the lenses obtained in this Example all exhibit good adhesion and scratch resistance.

Comparative Example 1

A cured film and an antireflection film were formed on a plastic substrate in the same manner as in Example 1, to which, however, no acetylene glycol compound was added.

The results are given in Table 1. As shown in Table 1, the adhesion of the lenses obtained herein is poor.

TABLE 1

| | Plastic substrate | Acetylene compound | Inorganic fine oxide particles and their content (based on the total weight of coating composition) | Antireflection film | Adhesion Just after formed | Adhesion After 48 hours at 50° C. | Scratch resistance |
|---|---|---|---|---|---|---|---|
| Example 1 | CR-39 | Sarfinol ® 104 | $SiO_2$ (12 wt. %) 43% in film | Film constitution A | ⊙⊙ | ⊙ | 6 |
| Example 2 | CR-39 | Sarfinol ® 465 | $SiO_2$ (12 wt. %) 43% in film | Film constitution A | ⊙⊙ | ⊙ | 6 |
| Comparative Example 1 | CR-39 | Not added | $SiO_2$ (12 wt. %) 43% in film | Film constitution A | x | x | 6 |
| Example 3 | CR-39 | Compound (a) | $SiO_2$ (12 wt. %) 43% in film | Film constitution A | ⊙⊙ | ⊙ | 6 |
| Example 4 | CR-39 | Compound (b) | $SiO_2$ (12 wt. %) 43% in film | Film consitiution A | ⊙⊙ | ⊙ | 6 |
| Example 5 | CR-39 | Compound (c) | $SiO_2$ (12 wt. %) 43% in film | Film constitution A | ⊙⊙ | ⊙ | 6 |

As described above in detail, the coating composition of the invention forms a cured film having excellent scratch resistance as well as excellent adhesion between the cured film and the antireflection film. The invention has made it possible to form an antireflection film even on a cured film on which an antireflection film could not be formed with good adhesion thereto in the conventional techniques. The optical elements fabricated by the use of the coating composition have good scratch resistance and exhibit good adhesion between the cured film made of the composition and the antireflection film, and the degree of adhesion between the two films decreases little over time.

The descriptions presented herein enable persons skilled in the art to make and use the invention. Although the invention has been fully described by way of examples, various modifications will be readily apparent to those skilled in the art, and the general principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed is:

1. A coating composition adapted to be cured to form a cured film between a plastic substrate and an antireflection film made of an inorganic oxide, comprising an organosilicon compound, fine inorganic oxide particles and an adhesion improver made of at least one member selected from acetylene compounds of general formulas (I-a) to (I-d)

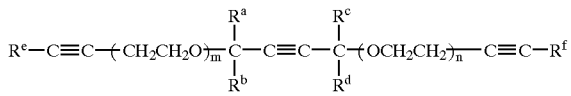
(I-a)

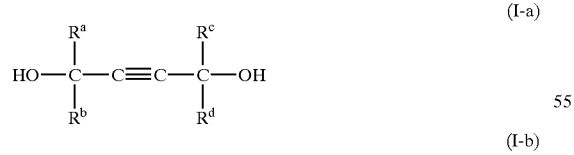
(I-b)

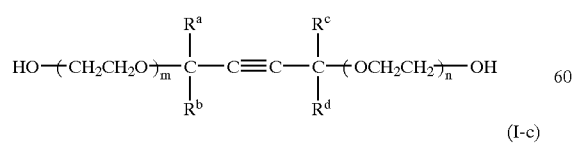
(I-c)

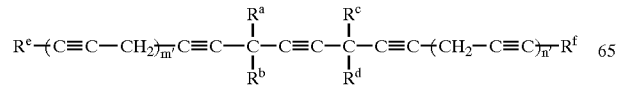
(I-d)

wherein $R^a$ and $R^c$ each independently represents a hydrogen atom, or an optionally branched alkyl group having from 1 to 5 carbon atoms; $R^b$ and $R^d$ each independently represents an optionally branched alkyl group having from 2 to 8 carbon atoms; $R^e$ and $R^f$ each independently represents an optionally branched alkyl group having from 1 to 3 carbon atoms; m and n each indicate an integer of 1 or more; and m' and n' each indicate an integer of 0 or more.

2. The coating composition as claimed in claim 1, wherein the organosilicon compound is at least one compound represented by the following general formulas (II) and (III) and hydrolyzates thereof:

$$(R^1)_a(R^3)_b Si(OR^2)_{4-(a+b)} \quad (II)$$

$$(X^1O)_{3-x}(R^4)_x Si\text{—}Y\text{—}Si\,(R^5)_y(OX^2)_{3-y} \quad (III)$$

wherein $R^1$ and $R^3$ each independently represents a monovalent hydrocarbon group having from 1 to 10 carbon atoms and having or not having a functional group; $R^2$ represents an alkyl group having from 1 to 8 carbon atoms, an aryl group having from 6 to 10 carbon atoms, an aralkyl group having from 7 to 11 carbon atoms, or an acyl group having from 1 to 8 carbon atoms a and b are each 0 or 1; and $OR^2$'s may be the same or different; $R^4$ and $R^5$ each independently represents a monovalent hydrocarbon group having from 1 to 5 carbon atoms and having or not having a functional group; $X^1$ and $X^2$ may be the same or different and each independently represents an alkyl group having from 1 to 4 carbon atoms, or an acyl group having from 1 to 4 carbon atoms; Y represents a divalent hydrocarbon group having from 1 to 20 carbon atoms; and x and y are each 0 or 1.

3. The coating composition as claimed in claim 1 or 2, wherein the inorganic oxide of the fine particles is at least one oxide selected from the group consisting of aluminum oxide, iron oxide, tin oxide, zirconium oxide, silicon oxide, titanium oxide, tungsten oxide, antimony oxide and mixtures and composite oxides thereof.

4. The coating composition as claimed in claim 1 or 2, wherein the content of the inorganic oxide fine particles is from 10 to 30% by weight based on the total weight of the coating composition.

5. An optical element comprising a plastic substrate, a cured film formed on the substrate by applying and curing the coating composition of claim 1 or 2 and an antireflection film made of an inorganic oxide formed on the cured film.

6. The optical element as claimed in claim 5, further comprising a base layer of a metal film or a metal oxide film formed between the cured film and the antireflection film.

7. The optical element as claimed in claim 5, further comprising a base layer of a metal film or a metal oxide film formed between the cured film and the antireflection film.

8. The optical element as claimed in claim 5, wherein the cured film contains from 30 to 60% by weight, based on the total weight of the cured film, of inorganic oxide fine particles.

9. The optical element as claimed in claim 5, wherein the plastic substrate is selected from the group consisting of methyl methacrylate homopolymers, copolymers of methyl methacrylate with at least one other monomer, diethylene glycol bisallylcarbonate homopolymers, copolymers of diethylene glycol bisallylcarbonate with at least one other monomer, sulfur-containing copolymers, halogen-containing copolymers, polycarbonate, polystyrene, polyvinyl chloride, unsaturated polyesters, polyethylene terephthalate, polyurethane, and polythiourethane.

10. The coating composition as claimed in claim 3, wherein the content of the inorganic oxide fine particles is from 10 to 30% by weight based on the total weight of the coating composition.

* * * * *